US009870036B2

(12) United States Patent
Hedge et al.

(10) Patent No.: US 9,870,036 B2
(45) Date of Patent: *Jan. 16, 2018

(54) AFFINITY-AWARE PARALLEL ZEROING OF MEMORY FOR INITIALIZATION OF LARGE PAGES IN NON-UNIFORM MEMORY ACCESS (NUMA) SERVERS

(71) Applicant: International Business Machines Corporation, Armonk, NY (US)

(72) Inventors: Nikhil Hedge, Austin, TX (US); Bruce Mealey, Austin, TX (US); Mark D. Rogers, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 14/986,930

(22) Filed: Jan. 4, 2016

(65) Prior Publication Data
US 2017/0108902 A1    Apr. 20, 2017

Related U.S. Application Data

(63) Continuation of application No. 14/883,304, filed on Oct. 14, 2015.

(51) Int. Cl.
*G06F 3/06* (2006.01)
*G06F 1/24* (2006.01)
*G06F 12/02* (2006.01)

(52) U.S. Cl.
CPC .............. *G06F 1/24* (2013.01); *G06F 3/0608* (2013.01); *G06F 3/0629* (2013.01); *G06F 3/0652* (2013.01); *G06F 12/023* (2013.01); *G06F 2212/1044* (2013.01); *G06F 2212/2542* (2013.01)

(58) Field of Classification Search
None
See application file for complete search history.

(56) References Cited

U.S. PATENT DOCUMENTS 6,088,777 A * 7/2000 Sorber ................. G06F 9/5016
370/381
6,601,153 B1 * 7/2003 Engelbrecht ............ G06F 12/08
707/999.2

(Continued)

OTHER PUBLICATIONS

IBM "List of IBM Patents or Patents Applications Treated As Related".

(Continued)

*Primary Examiner* — Kaushikkumar Patel
(74) *Attorney, Agent, or Firm* — Patterson + Sheridan, LLP

(57) ABSTRACT

A method for zeroing memory in computing systems where access to memory is non-uniform includes receiving, via a system call, a request for a pool of memory. The method also includes determining a size of the requested pool of memory, and creating a dummy memory segment. The size of the dummy memory segment is larger than the size of the requested pool of memory. The method further includes filling the dummy memory segment with one or more pages, based on the determined size of the requested pool of memory, and deleting the dummy memory segment.

7 Claims, 12 Drawing Sheets

(56) References Cited

U.S. PATENT DOCUMENTS

| | | | | |
|---|---|---|---|---|
| 6,973,541 B1* | 12/2005 | Williams | ............ | G06F 9/30047 |
| | | | | 711/118 |
| 7,484,070 B1* | 1/2009 | Walton | ................ | G06F 12/023 |
| | | | | 711/100 |
| 2005/0050295 A1* | 3/2005 | Noel | ...................... | G06F 12/08 |
| | | | | 711/206 |
| 2005/0097294 A1* | 5/2005 | Hepkin | ................ | G06F 9/4812 |
| | | | | 711/170 |
| 2006/0106990 A1* | 5/2006 | Benhase | ............ | G06F 12/0804 |
| | | | | 711/135 |
| 2006/0117160 A1* | 6/2006 | Jackson | ................ | G06F 1/3203 |
| | | | | 711/170 |
| 2013/0254500 A1* | 9/2013 | Nakajima | ............... | G06F 3/061 |
| | | | | 711/162 |
| 2015/0149514 A1* | 5/2015 | Kim | ................ | G06F 17/30339 |
| | | | | 707/812 |
| 2015/0220447 A1* | 8/2015 | Okamoto | ............ | G06F 12/023 |
| | | | | 711/130 |
| 2015/0378615 A1* | 12/2015 | Ramanujan | ............ | G11C 7/20 |
| | | | | 711/103 |

OTHER PUBLICATIONS

U.S. Appl. No. 14/883,304, entitled Affinity-Aware Parallel Zeroing of Memory for Initialization of Large Pages in Non-Uniform Memory Access (NUMA) Servers, filed Oct. 14, 2015.

* cited by examiner

US 9,870,036 B2

AFFINITY-AWARE PARALLEL ZEROING OF MEMORY FOR INITIALIZATION OF LARGE PAGES IN NON-UNIFORM MEMORY ACCESS (NUMA) SERVERS

CROSS-REFERENCE TO RELATED APPLICATIONS

This application is a continuation of co-pending U.S. patent application Ser. No. 14/883,304, filed Oct. 14, 2015, which claims benefit of U.S. Provisional Patent Application Ser. No. 62/184,736, filed on Jun. 25, 2015, and titled "AFFINITY-AWARE PARALLEL ZEROING OF MEMORY IN NON-UNIFORM MEMORY ACCESS (NUMA) SERVERS," which is incorporated by reference herein in its entirety.

BACKGROUND

The present disclosure relates to techniques for managing memory in computing systems, and more specifically to techniques for zeroing memory in computing systems where access to memory is non-uniform.

Concerns over memory mismanagement continue to increase due to the increasing inadvertent and malicious misuse of memory in computing systems. For example, the same memory is often used by different applications or processes within an operating system instance. Additionally, in systems that employ virtualization as a tool to abstract physical resources (such as processors, memory, storage, etc.) into different logical partitions (running different operating systems), the same memory can also be used by different applications (or processes) in each logical partition. In these situations, it is often possible for a subsequent application to access or recover data within memory that was used by the previous application. This recovered data, if exploited, can comprise the security of several programs in the operating system and/or comprise sensitive customer information.

To address these concerns, operating systems increasingly zero pages of memory before applications can use the memory. Page zeroing generally refers to the process of writing zeros or a binary pattern over pages of memory. Examples of such memory include memory segments used for stack, data, newly created shared memory regions, etc. Further, apart from the security concerns, page zeroing is also used as a tool to increase the efficiency of certain applications. For example, certain applications (e.g., cryptographic applications and others) can benefit from having pages of memory initially zeroed, since the applications do not have to explicitly initialize variables to zero.

As memory sizes continue to grow each year, however, implementing page zeroing for large amounts of memory is increasingly becoming a time-consuming and hardware intensive process. Thus, there is a need for improved methods for implementing page zeroing in systems that support large memory sizes.

SUMMARY

One embodiment presented herein describes a method. The method generally includes receiving, via a system call, a request for a pool of memory. The method also includes determining a size of the requested pool of memory, and creating a dummy memory segment. The size of the dummy memory segment is larger than the size of the requested pool of memory. The method further includes filling the dummy memory segment with one or more pages, based on the determined size of the requested pool of memory, and deleting the dummy memory segment.

DETAILED DESCRIPTION

Figure 1:
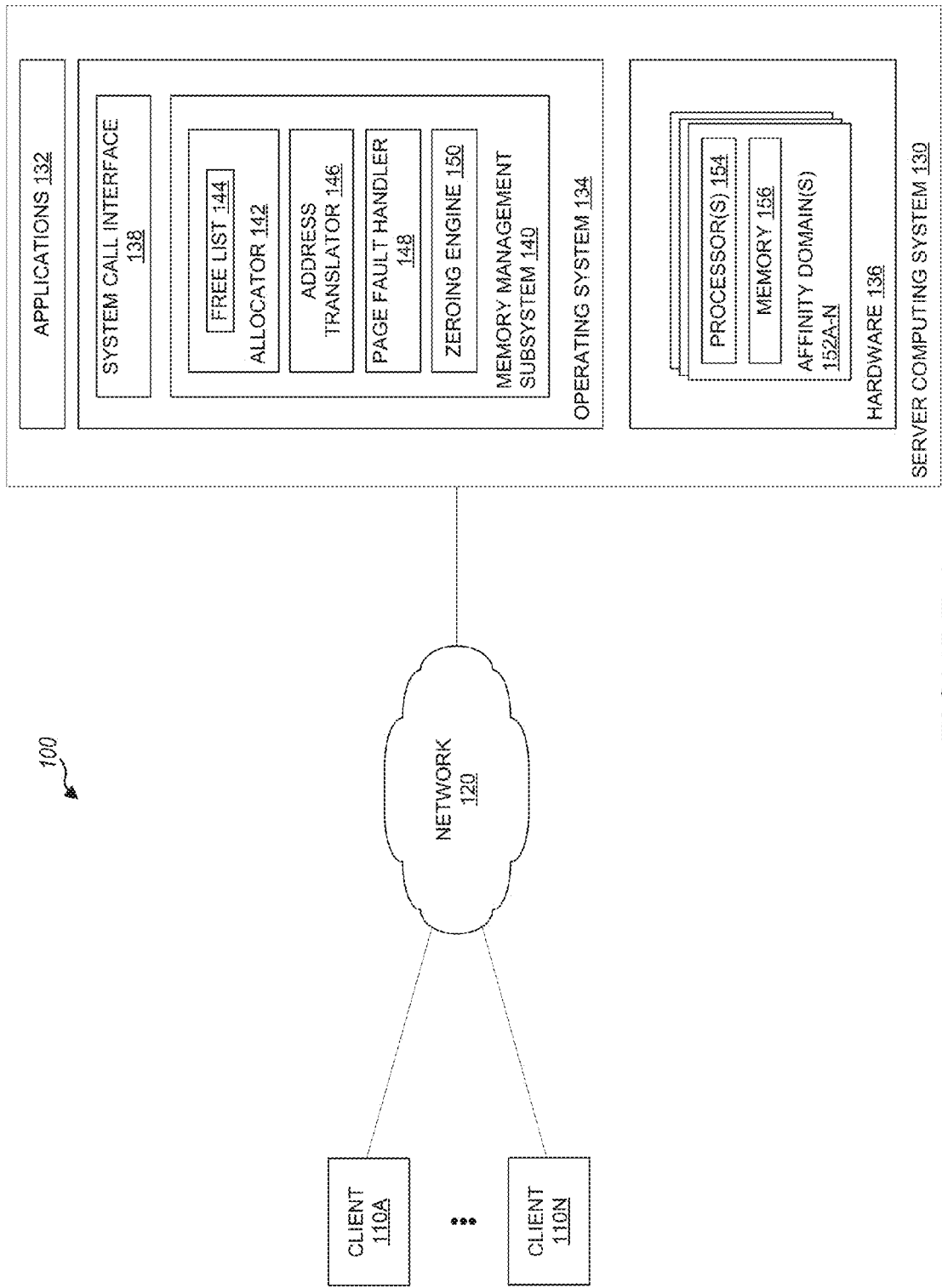
FIG. 1 illustrates an example computing environment, according to one embodiment.

Embodiments presented herein describe techniques for zeroing pages of memory in computing systems characterized, in part, by non-uniform memory access (NUMA). In one embodiment, the computing system includes several clusters of processors and memory, and one or more processors in each cluster may have different access pathways to the memory. Based on the distribution of the processors and memory in the different clusters, one or more affinity domains (or NUMA nodes) can be identified. For example, the affinity domains may each include a cluster of processors and memory local to the cluster of processors, and the local memory in the cluster may have the same access characteristics (e.g., such as latency of access, contention probability, etc.), for the processors in the cluster.

Within these computing systems, an application can request (via a system call) an operating system to tear down (or delete) a shared memory region. This request could occur, for example, when the memory region is no longer used by the terminating application (or process) or is no longer needed by another application. After the request is sent, the operating system sorts one or more pages of the memory region according to each page's associated affinity domain. The operating system then sends requests to zero the sorted pages to worker threads that are attached to the respective affinity domain (for the sorted pages). In one embodiment, upon receiving a message from the worker threads in each affinity domain that indicates all page zero requests have been completed for that affinity domain, the operating system returns to the system caller (e.g., the terminating application).

Operating system environments generally require the default state of most memory to be logically zero before any applications (or processes) can use the memory. Small memory pages (such as page sizes on the order of kilobytes (KBs), etc.) do not take long to zero out, and therefore, operating systems typically zero these small pages when a page fault occurs. For example, when an application (or process) tries to access a small page of memory that is mapped to a virtual address space, but not loaded in physical memory, the operating system's page fault handler can zero (or reset) the page of memory in-line (i.e., during the page-in process). On the other hand, it generally takes operating systems a significantly longer time to zero large memory pages (such as page sizes on the order of megabytes (MBs), gigabytes (GBs), etc.). These large memory pages, therefore, are not zeroed out (in-line) during the page fault process, since the latency experienced by an application from resolving the page fault would be too long.

Instead, operating systems generally zero large pages of a memory region at teardown time of the memory region. For example, when a given memory region is no longer needed (e.g., by the current application), the current application can request that the memory region be freed (or torn down). During teardown time, the operating system can then zero the large pages of the memory region, such that the pages will already be zeroed when they are re-allocated again (in the future) during a page fault.

As the size of memory rapidly grows each year, however, the techniques mentioned above are not sufficient at efficiently zeroing large memory regions. For example, the time that it takes to zero such large memory regions at teardown time can be very high. The long teardown process delays the exit time for the application and makes the zeroing process very visible to a user of the application.

Further, in computing systems where access to memory is non-uniform, the amount of time it takes to zero memory is affected by the different access pathways that exist between the processor (or processors) attempting to zero memory and the location of the memory. For example, the time in which memory may be accessed from a given processor (or processors) varies greatly, depending on how nearby the memory is to the processor attempting the access. In general, memory that is close (or local) to a processor (or cluster of processors) can be accessed much quicker than memory that is remote to a processor (or cluster of processors). The techniques presented above, however, are insufficient at efficiently zeroing memory in computing systems where access to memory is non-uniform.

Embodiments presented herein provide techniques for efficiently zeroing large pages of memory in computing systems characterized, in part, by non-uniform memory access (NUMA). As described in more detail below, the techniques presented herein can be used to perform zeroing in parallel, which improves the efficiency and speed of the zeroing process. Further, the techniques presented herein allow for pages of memory to be zeroed by software threads local to the memory's affinity domain, which provides optimal memory access time, and also improves the page zeroing process (relative to traditional techniques).

Note that, in the following description, many of the following embodiments use tear-down of shared memory as a reference example of a case where this type of memory can be efficiently zeroed (compared to traditional methods) using the techniques described herein. Note, however, that the techniques presented herein can also be applied in other cases (such as initialization of large memory pages, growing of large page pools, etc.) and can also be applied to other memory types (such as memory segments for stack, memory segments for data, etc.).

FIG. 1 illustrates an example computing environment 100, according to one embodiment. As shown, the computing environment 100 includes a plurality of clients 110A-N connected via the network 120 to a server computing system 130. In general, the network 120 may be a wide area network (WAN), local area network (LAN), wireless LAN (WLAN), etc. In one embodiment, each one of the clients 110A-N can be any kind of physical computing system having a network interface, such as a desktop computer, laptop computer, mobile device, tablet computer, and the like. The clients 110A-N can access (or share), via the network 120, resources hosted on one or more virtual machines within the server computing system 130.

The server computing system 130 includes a set of applications 132, an operating system 134 and hardware 136. The hardware 136 of the server computing system 130 includes processors 154 and memory 156 distributed across one or more affinity domains 152A-N. The processors 154 may represent one or more processors (e.g., microprocessors, central processing units (CPUs), etc.) or multi-core processors. The memory 156 may represent random access memory (RAM) devices that include the main storage of the server computing system 130, as well as supplemental levels of memory, e.g., cache memories, non-volatile or backup memories (e.g., programmable or flash memories), read-only memories, and the like. In addition, the memory 156 may include memory storage physically located in the server computing system 130 or on another computing device coupled to the server computing system 130.

The server computing system 130 operates under the control of the operating system 134, which is responsible for running applications 132 and managing the application(s)' 132 access to software resources and hardware resources 136. In one embodiment, the application 132 is a database application, such as an Oracle® database. The operating system 134 generally represents any operating system, with examples including versions of Microsoft® Windows®, Linux® and Unix® distributions, and so on.

As shown, the operating system 134 includes a system call interface 138 and a memory management subsystem 140. In one embodiment, the system call interface 138 and memory management subsystem 140 are located in the kernel of the operating system 134. The application(s) 132 can request services (e.g., make system calls) from the operating system 134 via the system call interface 138. The request for services can include resource requests for one or more processes, requests for the creation and execution of new processes, requests for access to various hardware devices (e.g., certain peripheral devices, etc.), requests for communication services, and others. For example, in one embodiment, the application(s) 132 can request, via the system call interface 138, that the operating system allocate certain resources, such as memory, to one or more processes of the application(s) 132.

The memory management subsystem (MMS) (or virtual memory manager (VMM)) 140 manages all requests for (physical and/or virtual) memory from the operating system 134 and applications 132. As shown, the MMS 140 includes allocator 142, address translator 146 and page fault handler 148. The MMS 140 uses the allocator 142 to allocate and/or de-allocate memory to the application processes and the kernel based on their needs. The allocator 142 maintains a list of free pages of real memory in the free list 144, from which it can allocate to the application processes.

The MMS 140 also implements virtual memory, which, in general, allows the operating system 134 to address more memory than is physically available in the server computing system 130 (e.g., by temporarily transferring pages of data from random access memory to secondary storage). To implement virtual memory, the MMS 140 relies on the address translator 146, which translates virtual addresses to physical addresses, and the page fault handler 148, which moves pages of data between physical memory and secondary storage when a page fault occurs. For example, if a process attempts to access a page of memory that is mapped to a virtual address space, but not loaded in physical memory, a page fault occurs and the page fault handler 148 attempts to page-in (or retrieve) the referenced page into physical memory. In some cases, the page fault handler 148 can attempt to resolve page faults with one of the unallocated pages maintained in the free list 144.

The page fault handler 148 can also be used to zero pages of memory before they are used by a set of processes. As mentioned above, for small pages of memory, the operating system 134 is configured to zero the pages of memory in-line (or during the page-in process) with the page fault handler 148. However, for large pages of memory, attempting to zero these large pages of memory within the page fault handler 148 is inefficient and time-consuming.

As also shown, the MMS 140 includes a zeroing engine 150 which performs the techniques presented herein. For example, as described below, in one embodiment, the zeroing engine 150 is configured to zero large pages of a shared memory region at teardown time of the shared memory region. In one embodiment, the zeroing engine 150 performs parallel zeroing of large memory regions in computing systems where access to memory is non-uniform, in order to reduce the time associated with zeroing large memory regions at teardown time. For example, in one embodiment, upon receiving a request to zero a shared memory region, the zeroing engine 150 segregates (or sorts) the memory region into multiple sections with each section containing pages that are associated with a NUMA affinity domain. The zeroing engine 150 then sends zeroing requests for the pages associated with each affinity domain to multiple zeroing (worker) threads attached to that affinity domain. Doing so in this manner allows the zeroing threads to address the pages of memory that are local to the zeroing threads' associated affinity domain. This improves memory access time and significantly reduces the amount of time associated with zeroing large pages of memory, relative to traditional techniques.

Note, however, that FIG. 1 illustrates merely one possible arrangement of the computing environment 100. More generally, one of ordinary skill in the art will recognize that other embodiments of computing systems can also be configured to implement memory zeroing in accordance with the techniques presented herein.

Figure 2:
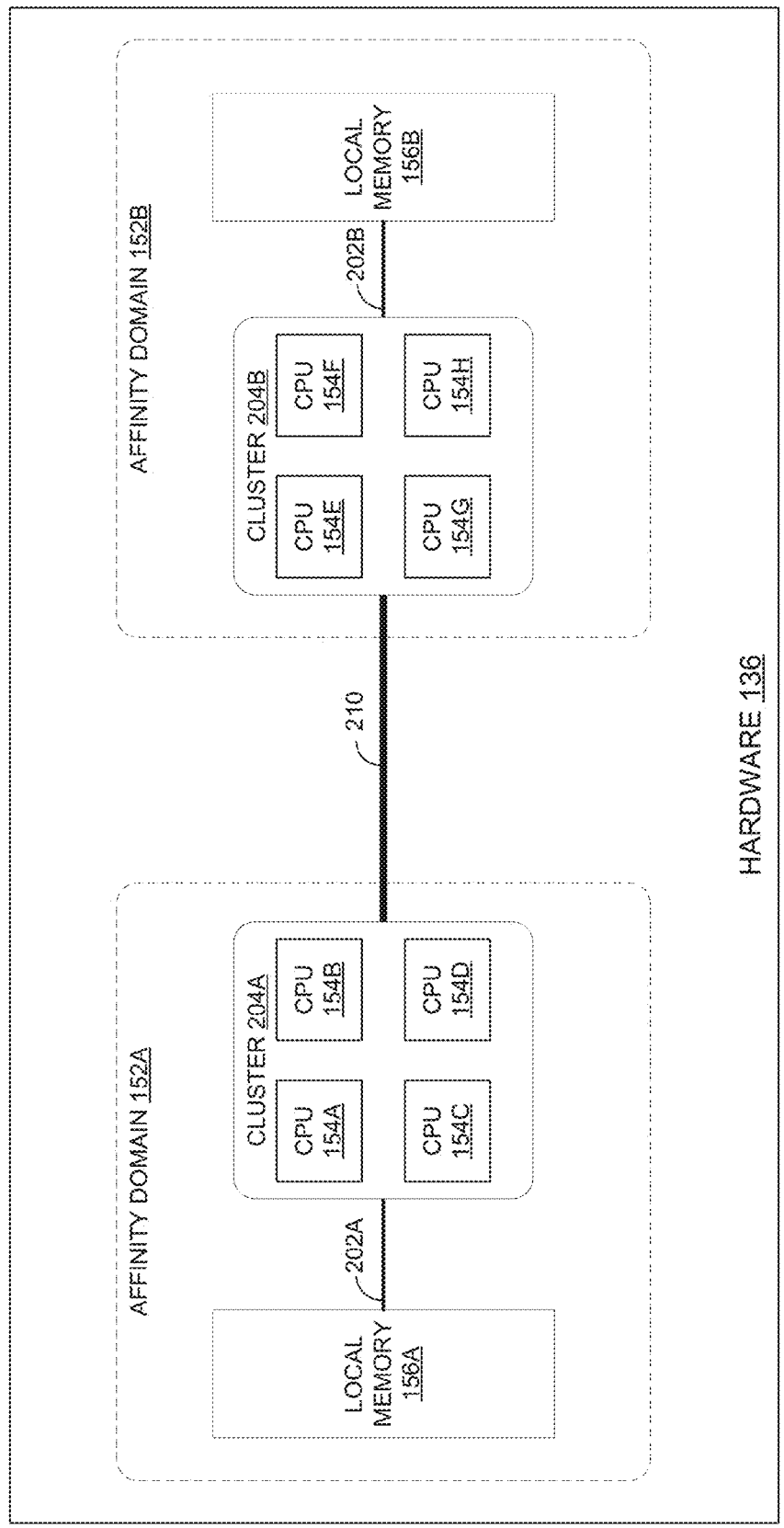
FIG. 2 illustrates an example of a hardware configuration of a computing system in which access to memory is non-uniform, according to one embodiment.

FIG. 2 further illustrates an example of the hardware 136 within the server computing system 130 described relative to FIG. 1, according to one embodiment. As shown, hardware 136 includes a distribution of CPUs 154A-H and memory 156A-B across affinity (or NUMA) domains 152A-B. In particular, the depicted embodiment shows a first cluster 204A that includes CPUs 154A-D and a second cluster 204B that includes CPUs 154E-H. The first cluster 204A is coupled to local memory 156A via a local bus 202A. Likewise, the second cluster 204B is coupled to local memory 156B via a local bus 202B. An intermediate bus 210 (also referred to as an interconnect) can be used to couple the CPUs in the cluster 204A to the CPUs in the cluster 204B.

In one embodiment, each of the cluster 204A and the cluster 204B represents a single processor chip that includes one or more processors. Moreover, although not shown, one or more memory controllers can also be integrated into (or external to) the clusters 204A and 204B. The memory controllers can be used by the CPUs in both of the clusters 204A and 204B, respectively, to access local memory 156A and 156B.

In one embodiment, the hardware 136 represents a NUMA architecture. A NUMA architecture, in general, classifies memory into affinity domains (or NUMA nodes) based on similar performance characteristics (e.g., speed, latency, contention probability, etc.) for the memory. For example, local memory 156A in affinity domain 152A may have the same access characteristics for the CPUs 154A-D in cluster 204A. Similarly, local memory 156B in affinity domain 152B may have the same access characteristics for the CPUs 154E-H in cluster 204B. For a given processor, accessing memory that is local to (or within) the same affinity domain is significantly faster than accessing memory that is remote to (or outside) the affinity domain. Further, accesses from processors to local memory also reduce (or avoid) contention on the intermediate bus 210 and the remote memory controllers. In the depicted embodiment, for example, the access time (or latency) for each of the CPUs 154A-D to local memory 156A is significantly lower than the access time for each of the CPUs 154A-D to remote memory 156B (since the CPUs 154A-D have to traverse both the intermediate bus 210 and the local bus 202B to access remote memory 156B). Likewise, the access time to local memory 156B by CPUs 154E-F is significantly lower than the access time to remote memory 156A by the CPUs 154E-F.

Note, however, that FIG. 2 illustrates merely one possible arrangement of processors 154 and memory 156 in the hardware 136. For example, although two affinity domains 152A and 152B are shown within the hardware 136, the hardware 136 could include any number of affinity domains. Further, any of the affinity domains could include different access pathways, different numbers of CPUs, clusters, etc., depending on the particular hardware configuration of a computing system.

Figure 3:
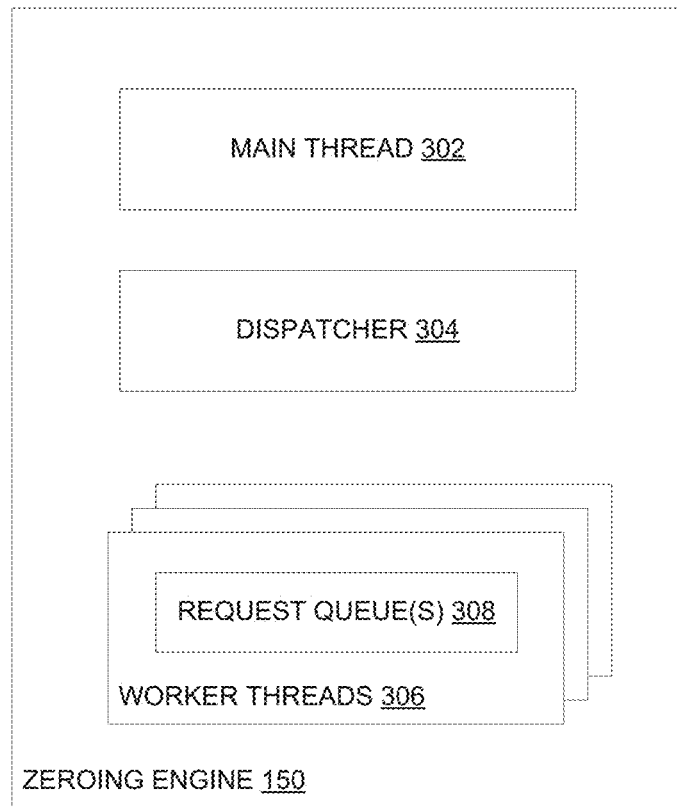
FIG. 3 illustrates a tool for parallel zeroing of pages in a computing system in which access to memory is non-uniform, according to one embodiment.

FIG. 3 further illustrates an example of the zeroing engine 150, described relative to FIG. 1, according to one embodiment. As shown, the zeroing engine 150 includes main thread 302, dispatcher 304 and worker threads 306. In one embodiment, the main thread 302 is a main process that manages all requests to zero pages that may be received (e.g., via a system call) from an application or process. In one embodiment, once the zeroing engine 150 is initialized (e.g., by the operating system 134), the main thread 302 is configured to analyze the distribution of CPUs 154 and memory 156 in the server computing system 130 and identify, based on the analysis, the topology of affinity domains (or NUMA) nodes within the server computing system 130. The main thread 302 then creates software worker threads 306, based on the identification.

In one embodiment, once the main thread 302 creates the worker threads 306, the zeroing engine 150 attaches (via the dispatcher 304) a subset of the created worker threads to each identified affinity domain. For example, referring to the embodiment depicted in FIG. 2, after the main thread 302 identifies affinity domains 152A-B, the main thread, in one embodiment, can create four worker threads 306, based on the identification. The dispatcher 304 can then attach two of the four workers threads to each affinity domain 152A and 152B. The attachment by the dispatcher binds the threads to their respective affinity domain and ensures that they operate within the affinity domain (e.g., by accessing memory that is local to the affinity domain, as opposed to attempting to access remote memory).

In one embodiment, the main thread 302 is also configured to set up request queues 308 in each affinity domain. The request queues 308 are used by the main process 302 to send zeroing work to each of the worker threads 306 that are attached to the respective affinity domains. For example, in a given affinity domain, the worker threads 306 attached to that affinity domain can monitor the requests queues 308 for zeroing work and pull work requests from the request queues 308 as the requests come in. In one embodiment, after the main thread 302 sets up the request queues 308, the worker threads 306 go to sleep (e.g., give up CPU access) and wait for the main thread 302 to assign zeroing work to the request queues 308.

In some embodiments, the zeroing engine 150 is capable of dynamically reacting to changes in the topology of affinity domains within the server computing system 130. Examples of events that can cause topology changes include dynamically adding memory to a logical partition (LPAR), dynamically removing memory from an LPAR, dynamically adding and/or removing processors, identifying a more optimal topology in response to running an optimization algorithm, and others. When one of these events occurs, it triggers the main thread 302 to adjust the number and/or distribution of zeroing threads for each affinity domain, based on the determined topology change. Doing so in this manner allows the main thread 302 to also sleep until the main thread 302 determines that there has been change in topology. In addition, the main thread 302 is configured to dynamically adjust the zeroing threads w/o a re-configuration or restart of the operating system by an administrator.

As mentioned above, the main thread 302 manages requests to zero pages. In one embodiment, the main thread 302 receives a request from an application or process (e.g., via a system call) to delete (or teardown) a memory region (e.g., a shared memory region). Such a request can occur when the application or process requesting teardown no longer needs access to the shared memory region. The size of the memory region can be very large such that the zeroing process for the particular shared memory region using traditional techniques would be time-consuming and inefficient.

Figure 4:
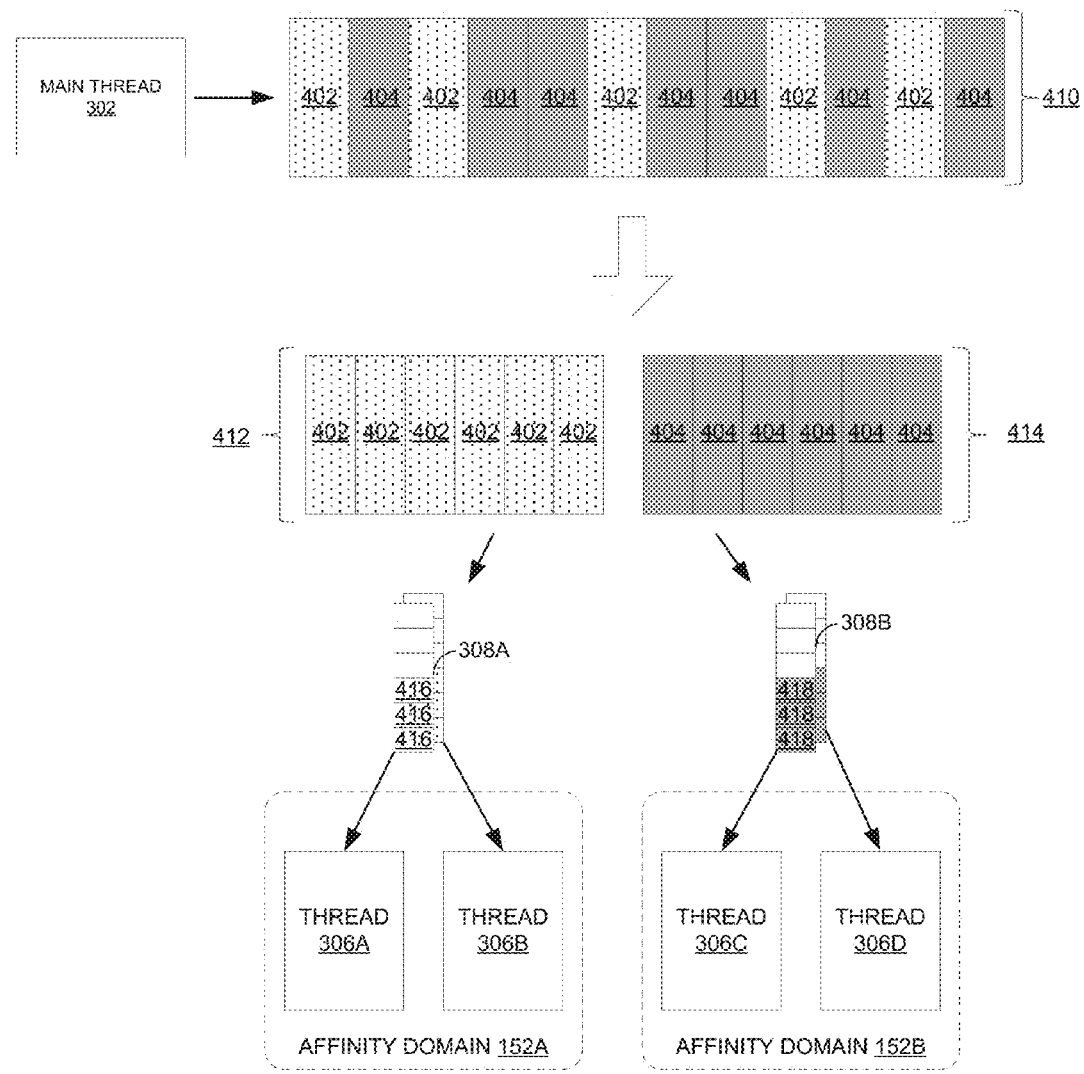
FIG. 4 illustrates an example of sorting pages of a memory region by affinity domain, according to one embodiment.

After the main thread 302 receives the request, the main thread 302 segregates the shared memory region into pages according to their affinity domains. For example, as shown in FIG. 4 (for one embodiment), the main thread segregates the shared memory region 410 into two segments 412 and 414. Each segment 412 and 414 includes pages of memory (from the shared memory region 410) sorted by the page's associated affinity domain. For example, as shown, segment 412 includes memory pages 402, which are associated with affinity domain 152A, and segment 414 includes memory pages 404, which are associated with affinity domain 152B.

After the main thread 302 segregates the shared memory into multiple pages by affinity domain, the main thread 302 creates work requests for each affinity domain and sends the requests to the request queue(s) for that affinity domain. For example, referring back to FIG. 4, the main thread 302 creates several work requests 416 (e.g., based on the number of memory pages 402 that need to be zeroed) and sends the work requests 416 to queues 308A set up in the affinity domain 152A. Similarly, the main thread 302 creates several work requests 418 (e.g., based on the number of memory pages 404 that need to be zeroed) and sends the work requests 418 to queues 308B set up in the affinity domain 152B.

After the main thread 302 sends the work requests 416 and 418, the worker threads 306 from each respective affinity domain wake up and pull the work requests from the request queue(s) 308. Each request is then processed (by the worker threads 306 in the respective affinity domain) by zeroing the memory pages indicated in the request. For example, as shown in FIG. 4, worker threads 306A-B attached to affinity domain 152A are configured to zero memory page sizes (indicated in the work requests 416) corresponding to affinity domain 152A. Similarly, worker threads 306C-D attached to affinity domain 152B are configured to zero memory pages (indicated in the work requests 418) corresponding to affinity domain 152B. Allowing memory pages from an affinity domain to be zeroed by multiple worker threads that are attached to that affinity domain (i.e., the worker threads are executed on one or more processors within the same affinity domain) achieves optimal memory access time and allows for memory zeroing of a given shared memory region to be performed in parallel, significantly reducing the time associated with zeroing large shared memory regions at teardown time.

Once each of the worker threads 306 process (or complete) a work request, each worker thread 306 notifies the process that generated the request (e.g., the main thread 302) that the request(s) have been completed. Once the main thread 302 receives a completion status for all work requests, the main thread 302 determines that the shared memory region is completely zeroed and returns to the system caller to continue with the next operation.

In one embodiment, the zeroing engine 150 is configured to automatically throttle itself (i.e., reduce or stop operation) in certain situations to reduce the load on hardware resources, such as the processors 154. For example, if the zeroing engine 150 determines that the parallel zeroing process will cause system utilization (e.g., CPU utilization, etc.) to exceed a predefined threshold, the zeroing engine 150 can stop zeroing memory pages (via the worker threads 306) and return to zeroing pages in-line with the page fault handler 146. In one embodiment, the zeroing engine 150 continues to zero pages of memory in-line until the zeroing engine 150 determines that the system utilization drops below the predefined threshold. Doing so in this manner ensures that the performance benefit provided by the zeroing engine 150 is higher than the resource overhead caused by the operation of the zeroing engine 150.

Figure 5:
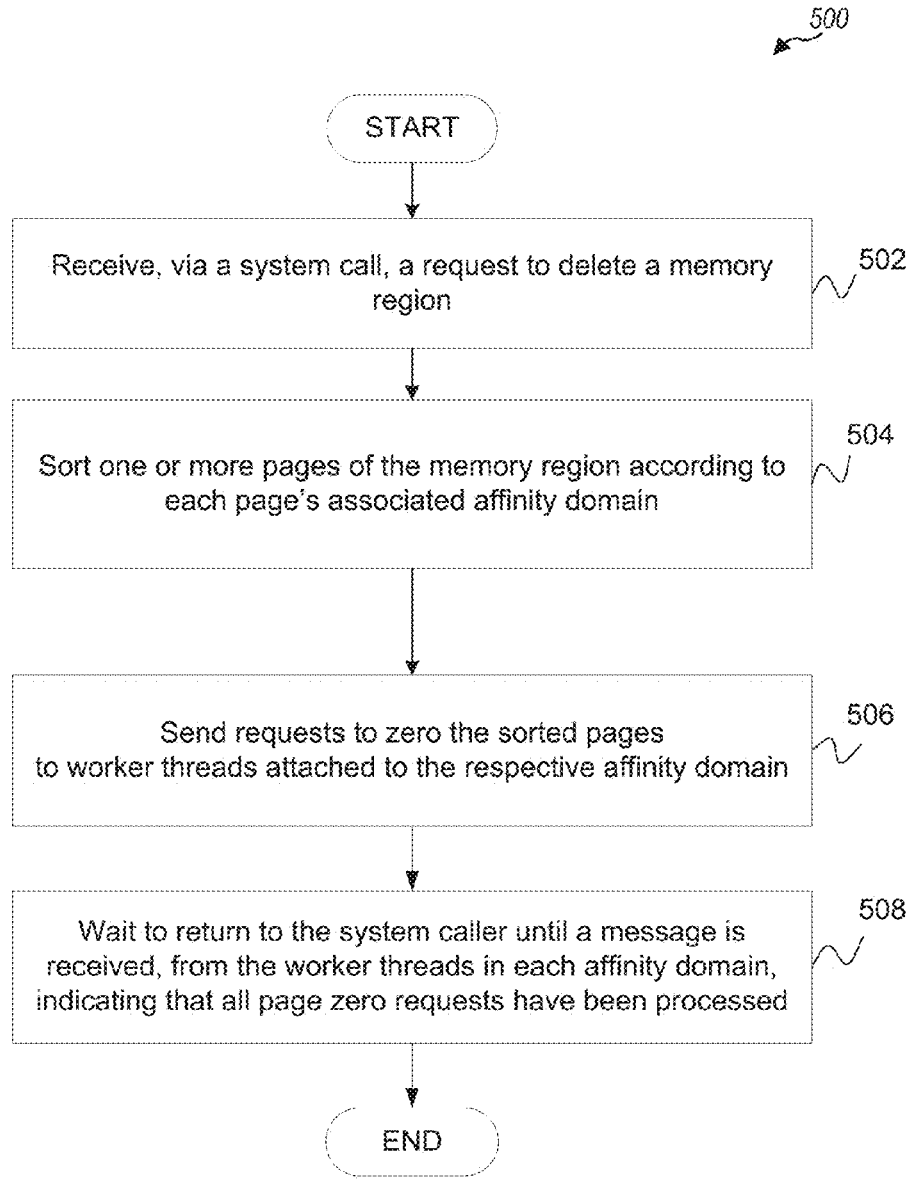
FIG. 5 illustrates a method for parallel zeroing of pages in a computing system in which access to memory is non-uniform, according to one embodiment.

FIG. 5 illustrates a method 500 for performing parallel zeroing of a memory region in a computing system where access to memory is non-uniform, according to one embodiment. As shown, the method 500 begins at step 502, where the zeroing engine 150 receives, via a system call, a request to delete a memory region (e.g., a shared memory region). At step 504, the zeroing engine 150 sorts one or more pages of the memory region according to an affinity domain associated with each of the one or more pages of the memory region. At step 506, the zeroing engine 150 sends requests to zero the sorted pages to software worker threads attached to the respective affinity domain. At step 508, the zeroing engine 150 waits to return to a system caller until a message is received, from the worker threads in each affinity domain, indicating that all page zeroing requests have been processed.

Figure 6:
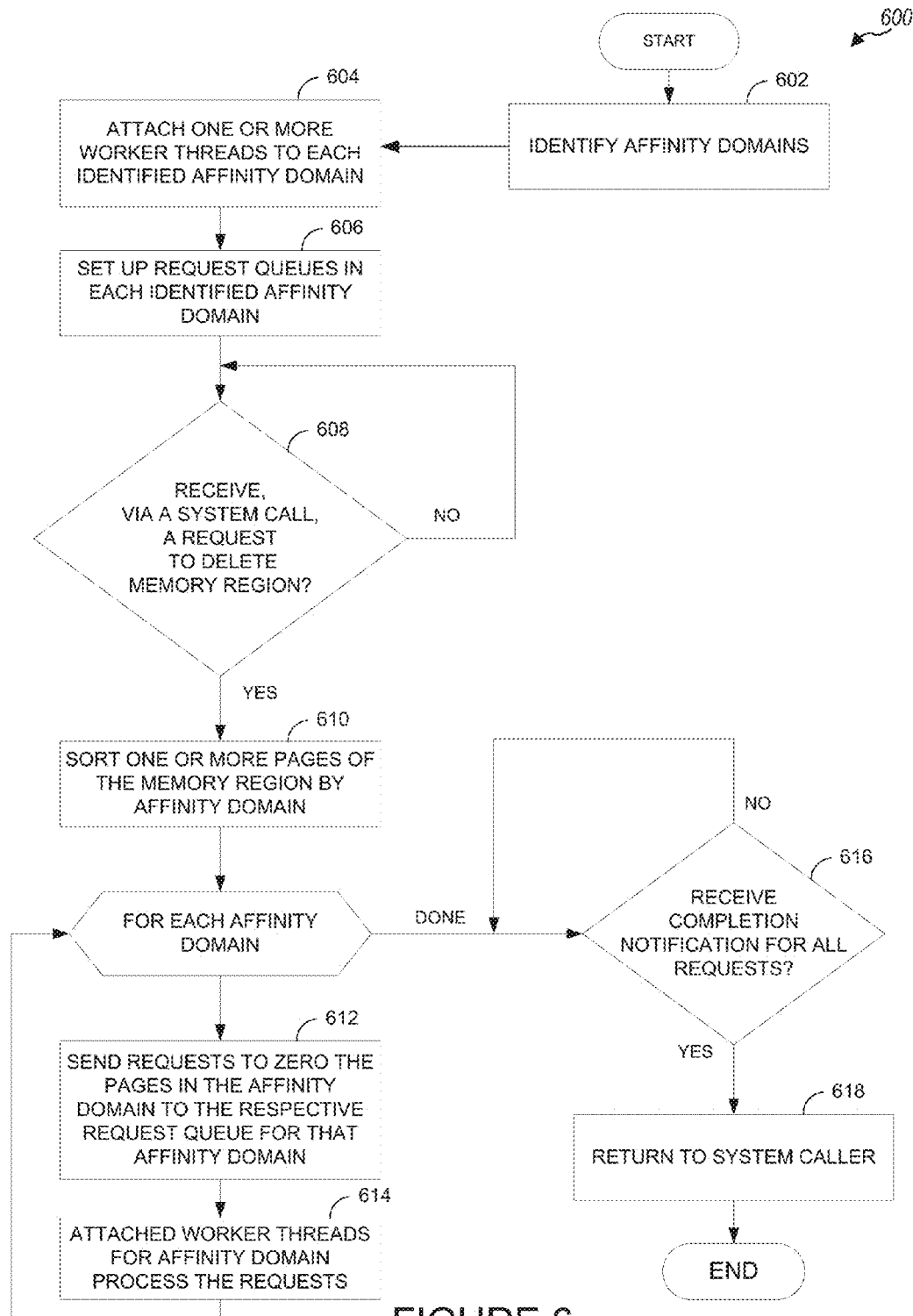
FIG. 6 illustrates another method for parallel zeroing of pages in a computing system in which access to memory is non-uniform, according to one embodiment.

FIG. 6 illustrates another method 600 for performing parallel zeroing of a memory region in a computing system where access to memory is non-uniform, according to one embodiment. As shown, the method 600 begins at step 602, where the main thread 302 identifies one or more affinity domains in the server computing system 130. For example, as mentioned above, the main thread 302 identifies the one or more affinity domains based on analyzing the distribution of processors and memory in the server computing systems' hardware. The main thread 302 then creates one or more software (e.g., worker, zeroing, etc.) threads based on the number of affinity domains identified by main thread 302.

At step 604, the dispatcher 304 attaches a subset of the one or more worker threads 306 to each identified affinity domain. As mentioned above, attaching the worker threads 306 to an affinity domain allows the threads to address memory that is local to their affinity domain, which reduces memory access time. At step 606, the main thread 302 sets up request queues in each identified affinity domain. After the main thread 302 sets up the request queues, both the main thread 302 and the worker threads 306 can give up CPU time and sleep. In an embodiment, the worker threads 306 can sleep until the worker threads 306 determine one or more work requests have been received. In an embodiment, the main thread 302 can sleep until the main thread 302 determines that a topology of affinity domains has changed.

At step 608, the main thread 302 determines whether a request to delete a memory region has been received (e.g., via a system call). If so, the main thread 302 sorts one or more pages of the memory region by affinity domain. For each affinity domain, the main thread (at step 612) sends requests to zero the pages in the affinity domain to the respective request queue (and, therefore, the worker threads 306) for that affinity domain. At step 614, the attached worker threads for the affinity domain process the work (zeroing) requests.

Once the main thread 302 sends work requests to the worker threads 306 for each affinity domain, the method proceeds to step 616, where the main thread 302 determines whether a notification of completion has been received for all work requests. If so, the main thread 302 returns to the system caller at step 618 and continues to the next operation. If not, the main thread 302 remains at step 616 until the main thread 302 determines that a notification of completion has been received for all work requests.

As such, embodiments presented herein achieve considerable performance improvements in implementing memory zeroing at teardown time of a large shared memory region, by zeroing the memory pages in parallel (e.g., with multiple zeroing threads) and by keeping the thread that is zeroing a particular memory page in the same affinity domain as the memory page. Embodiments presented herein also allow for the zeroing engine 150 to react dynamically to system topology changes, e.g., such that the zeroing engine 150 can automatically adjust and re-attach zeroing threads based on a change in affinity domains.

However, while the embodiments described above can significantly improve zeroing performance of large memory regions, in some cases, the process requiring the zeroing (e.g., the main thread of the zeroing engine) has to wait for the zeroing process to complete, before returning to the system caller and continuing with a next operation. Thus, it may be helpful to allow the main thread to do other useful work while waiting for the zeroing process to complete.

Figure 7:
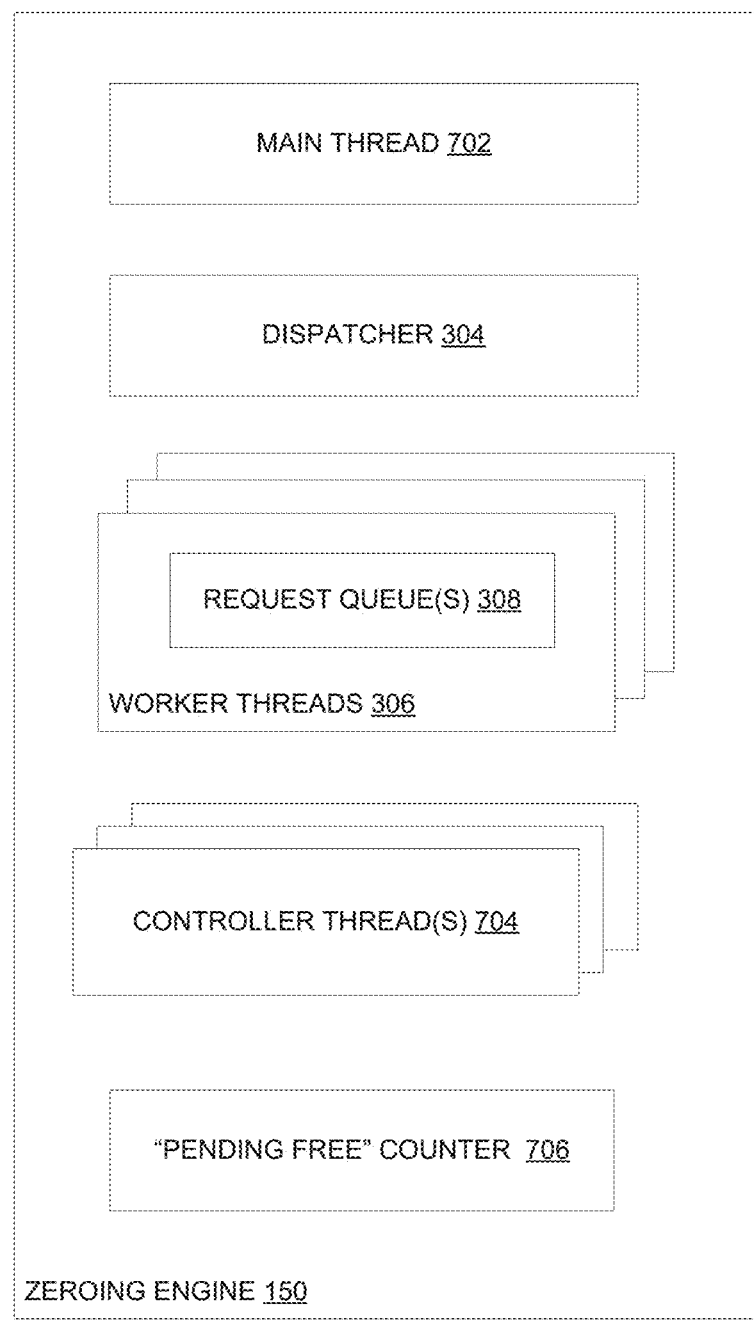
FIG. 7 illustrates a tool for parallel zeroing of pages in a computing system in which access to memory is non-uniform, according to one embodiment.

FIG. 7 further illustrates another example of the zeroing engine 150, described relative to FIG. 1, according to one embodiment. Note that many of the components (e.g., dispatcher 304, worker threads 306, queues 308, etc.) of the zeroing engine 150 depicted in FIG. 7 have same or similar functions as their corresponding components described relative to FIGS. 3-6. Therefore, for the sake of convenience, these functions (where the same) may not be described again below in the description.

As shown, the zeroing engine 150 (in this embodiment) includes main thread 702, dispatcher 304 and worker threads 306. In this embodiment, the zeroing engine 150 is configured to perform parallel zeroing of a shared memory region in the background (or off-line), which allows the main thread 702 to return immediately to the system caller, instead of waiting for the parallel zeroing process to be completed by the worker threads 706. Once the main thread 702 returns to the system caller, the main thread 702 is able to perform other operations.

To implement parallel zeroing of memory off-line or in the background, the zeroing engine 150 (in this embodiment) includes one or more controller threads 704 and "pending free" counter 706 in addition to worker threads 306. In one embodiment, the main thread 702 creates the controller thread(s) 704 at the same time that the main thread 702 creates the worker threads 306 (e.g., after identifying one or more affinity domains). In one embodiment, the zeroing engine 150 can use the dispatcher 304 to attach the controller thread(s) 704 to the same affinity domain as the worker threads 306. In one embodiment, the controller thread(s) 704 may not be attached to any affinity domains. As described in more detail below, the controller thread(s) 704 are configured to work on behalf of the main thread 702. Doing so in this manner allows the main thread 702 to return to the system caller to perform other operations, while the controller thread(s) 704 continues to zero memory as a background process.

In an embodiment, once the main thread 702 receives a request, via a system call, to delete a shared memory region, the main thread 702 prepares a subsequent request and forwards the request to the controller thread(s) 704. The request can include information about the shared memory region (e.g., such as size, type, etc.) to a controller thread(s) 704. The controller thread(s) 704 prepares the shared memory region by marking each virtual memory segment covering the region as "delete pending." Marking these segments as "delete pending" blocks any subsequent input/output (I/O), or other attaches to the shared memory region for use. The controller thread(s) 704 then updates a global count of the number of pages that are "pending free" via the parallel zeroing mechanism, disclosed herein. A global count of the amount of memory available for re-use is also maintained. In one embodiment, the main thread 702 is not allowed to return to the system caller (or terminate its process) until the controller thread(s) 704 updates the "pending free" counter 706. For example, in some situations, there could be a request for large pages of memory that occur while the shared memory region is in the process of been torn down. In these situations, as described below, updating the "pending free" counter 706 can alert the zeroing engine 150 as to the existence of these requests and allow the zeroing engine 750 to give an update to the requester as to whether any large pages will be available soon.

After the controller thread(s) 704 updates the "pending free" counter 706, the controller thread(s) 704 then performs similar operations (e.g., such as segregating the memory region into pages of memory based on affinity, creating and sending work requests to worker threads 306 in the associated affinity domain, and waiting to receive complete notifications from each of the worker threads 306) as the main thread 302 described relative to FIGS. 3-6. In particular, using FIG. 4 as an example, the controller thread 702 is configured to perform the same operations as the main thread 302 depicted in FIG. 4. Note, however, that, in FIG. 4, once the worker threads complete the work (zeroing) requests from the queues, each of the worker threads notifies the controller thread 702 of their completion (e.g., as opposed to notifying the main thread 302).

In one embodiment, after the controller thread(s) 702 receives notification that all work requests have been processed, the controller thread(s) 702 updates the global count of memory that is now available for other applications. Further, the controller thread(s) 702 notifies any processes waiting for large pages to be made available on the free list.

Doing so in this manner allows applications (or processes) to terminate while memory pages are zeroed in the background. Further, the embodiments described herein can also be used to handle requests for large memory pages, when there is not enough memory to currently satisfy the request. For example, requests for large memory pages typically fail if there is not enough memory available to satisfy the memory request. Embodiments presented herein, however, allow for processes waiting for large pages (not currently available) to decide whether they want to wait for "pending free" pages of memory currently being zeroed, instead of terminating. For example, the global count of "pending free" pages and/or the global count of available memory pages (described above) can be used as additional pieces of information to indicate to waiting processes that there are potentially more large pages that are being zeroed and will be made available in the future (e.g., on the free list 144). Based on these global counts, the application requesting the large memory page (not currently available) can determine whether to wait for the large pages of memory that are being zeroed to show up on the free list 144.

In one embodiment, once an application (e.g., requester) requests an allocation of memory, the application can determine that the request will succeed immediately if the requested allocation is less than or equal to an amount of memory currently available (e.g., based on the global count of available memory pages, free list 144, etc.). In one embodiment, the application can determine to wait for the zeroing process to complete if the requested allocation is less than or equal to the sum of the amount of memory currently available plus the amount of memory pending zero (e.g., based on the global count of available memory pages and the global count of "pending free" memory pages). In one embodiment, the application can determine that the requested allocation will not succeed (and thus not wait for the zeroing process to complete) if the requested allocation is greater than the amount of memory currently available plus the amount of memory pending zero.

Figure 8:
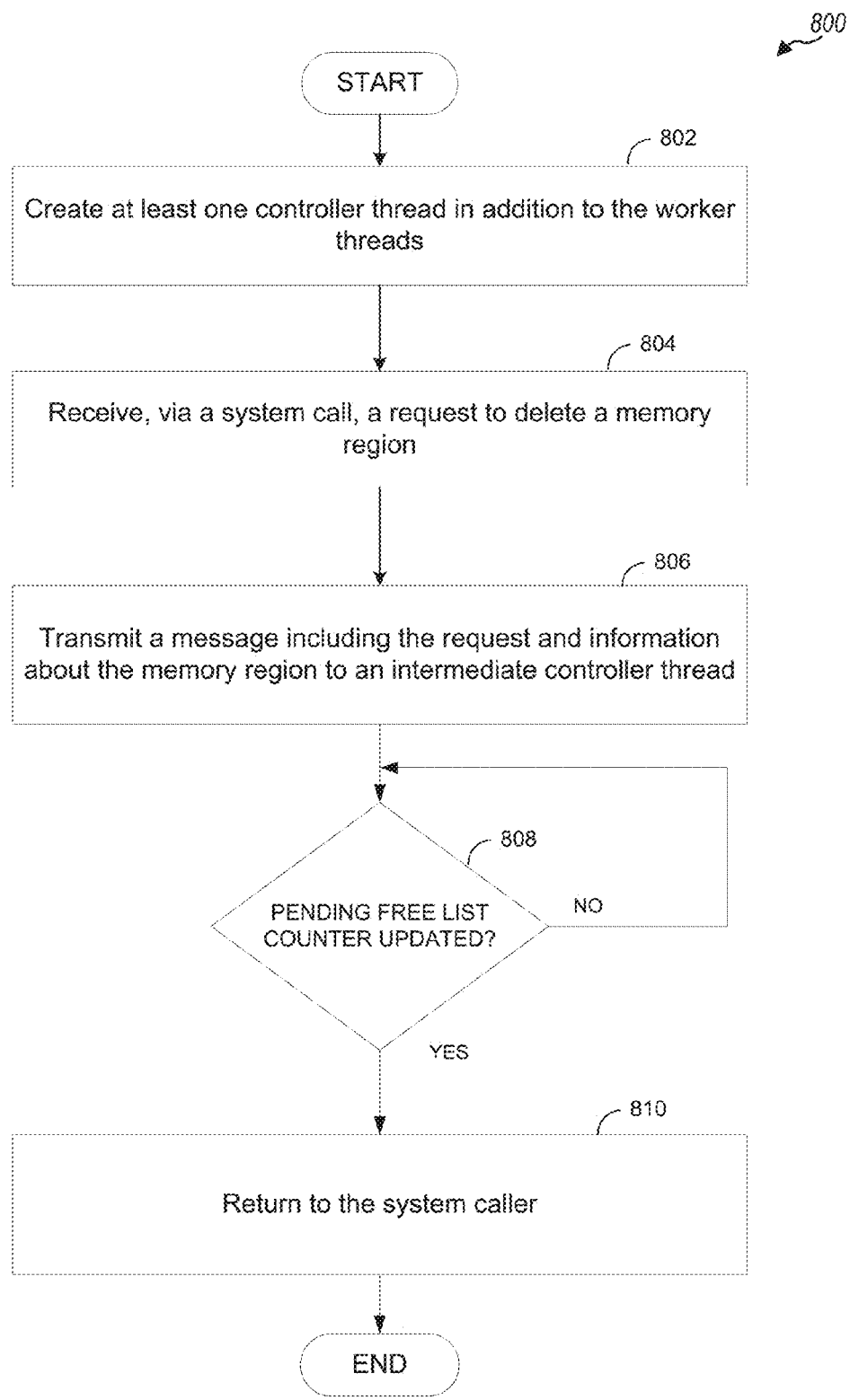
FIG. 8 illustrates a method for parallel zeroing of pages in a computing system in which access to memory is non-uniform, according to one embodiment.

FIG. 8 illustrates a method 800 for performing parallel zeroing of a memory region in a computing system where access to memory is non-uniform, according to one embodiment. As shown, the method 800 begins at step 802, where the main thread 702 of the zeroing engine 150 creates at least one controller thread (e.g., intermediate software thread) in addition to the software worker threads (e.g., after identifying one or more affinity domains in the server computing system 130). At step 804, the main thread 702 receives, via a system call, a request to delete a shared memory region. At step 806, the main thread 702 transmits (or forwards) a message that includes the request and information about the memory region to an intermediate controller thread. At 808, the main thread 702 then determines whether the "pending free" counter 706 has been updated. If not, the main thread 702 continues to wait until the "pending free" counter 706 has been updated. If so, the main thread 702 returns to the system caller and can perform other operations. In one embodiment, when the main thread 702 returns to the system caller, the intermediate controller thread continues to perform zeroing (e.g., on behalf of the main thread 702) as a background process.

Figure 9:
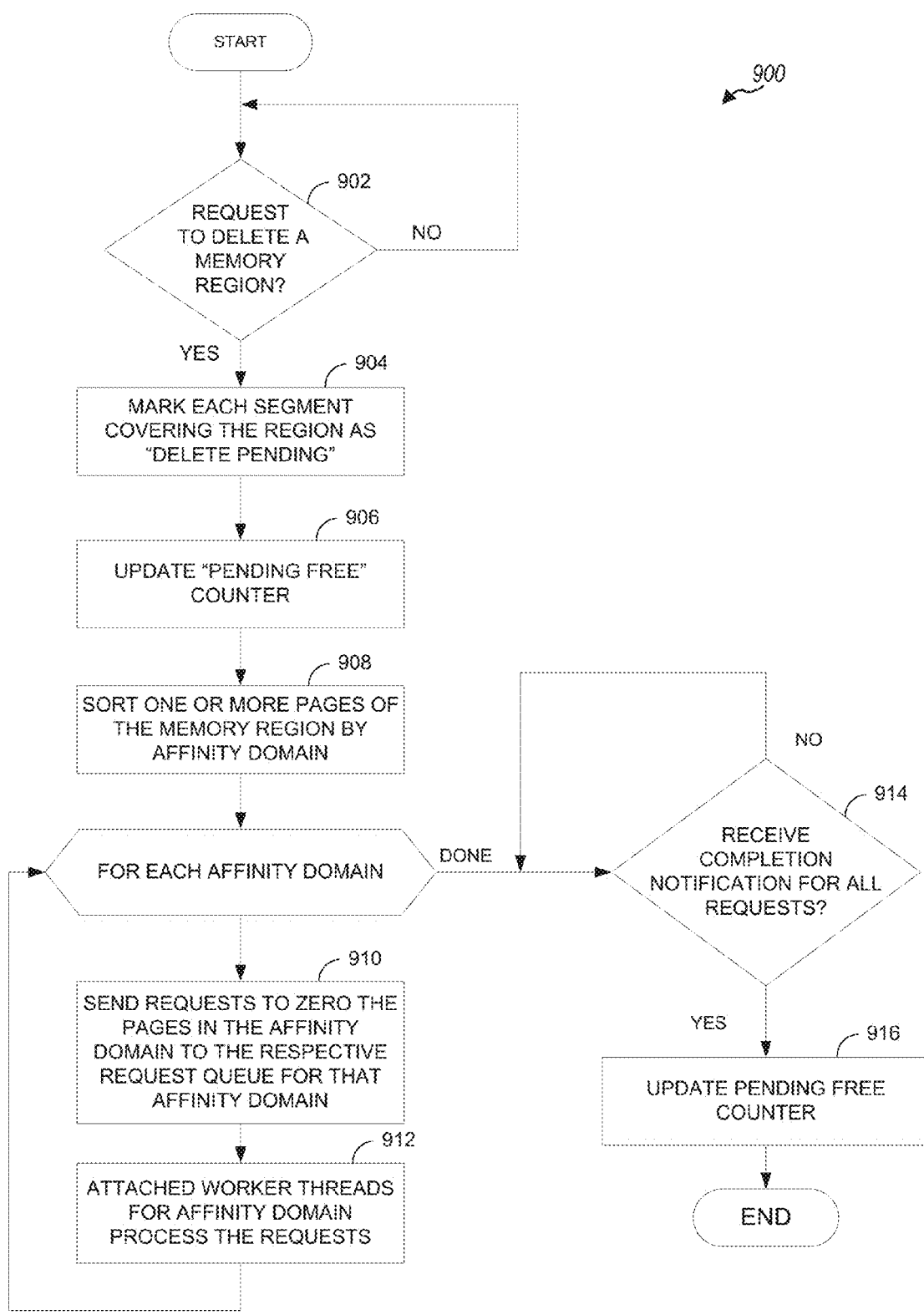
FIG. 9 illustrates another method for parallel zeroing of pages in a computing system in which access to memory is non-uniform, according to one embodiment.

FIG. 9 illustrates another method 900 for performing parallel zeroing of a memory region in a computing system where access to memory is non-uniform, according to one embodiment. As shown, the method 900 begins at step 902, where the controller thread 704 determines whether a request to delete a shared memory region has been received from the main thread 702. If not, the controller thread 704 remains idle. If so, the method proceeds to step 904 where the controller thread 704 marks each segment covering the region as "delete pending" (e.g., to prevent other uses of the memory region during the zeroing process). At 906, the controller thread 704 updates the "pending free" counter 706. As mentioned above, the "pending free" counter 706 is a counter that keeps track of the expected number of memory pages that will soon be free after the zeroing process has been completed. A more accurate estimate of the expected free (and zeroed) memory pages can be obtained by updating the "pending free" counter 706 before the main thread returns to the system caller.

After updating the "pending free" counter 706, the controller thread 704 performs steps 908-914, which are similar to steps 610-616 described relative to FIG. 6. After the controller thread 704 receives (in step 914) completion notifications for all zeroing work requests, the controller thread 704 updates the "pending free" counter 706 for a second time.

As mentioned above, although many of the above embodiments use teardown of shared memory regions as a reference example of a scenario where the techniques described herein can be applied, the techniques presented herein can also be used in other scenarios. For example, in one embodiment, the techniques presented herein can be used to zero pages of memory in a page pool that dynamically grows. Further, in one embodiment, the techniques presented herein can also be applied at boot-time initialization of large pages.

Some operating systems are capable of reserving certain large pages (e.g., such as 16 Mb pages and others) dynamically. For example, a system administrator of an operating system can run a command (e.g., such as 'vmo') to set aside a certain amount of system memory for 16 Mb pages. The pages are then zeroed by the same command and put on the free list to be allocated when a page fault occurs. However, using the 'vmo' command to zero these large pages can take a long time and therefore is not efficient for zeroing large pages, especially as memory sizes continue to grow.

Further, typically at initial program load (IPL) time of an operating system, large pages are initialized to zero. However, initializing large pages at boot time also takes a very long time and can be visible to a user of the operating system (e.g., continuing on, well after the system has booted). As such, it may be helpful to provide improved methods for zeroing memory during these scenarios.

Figure 10:
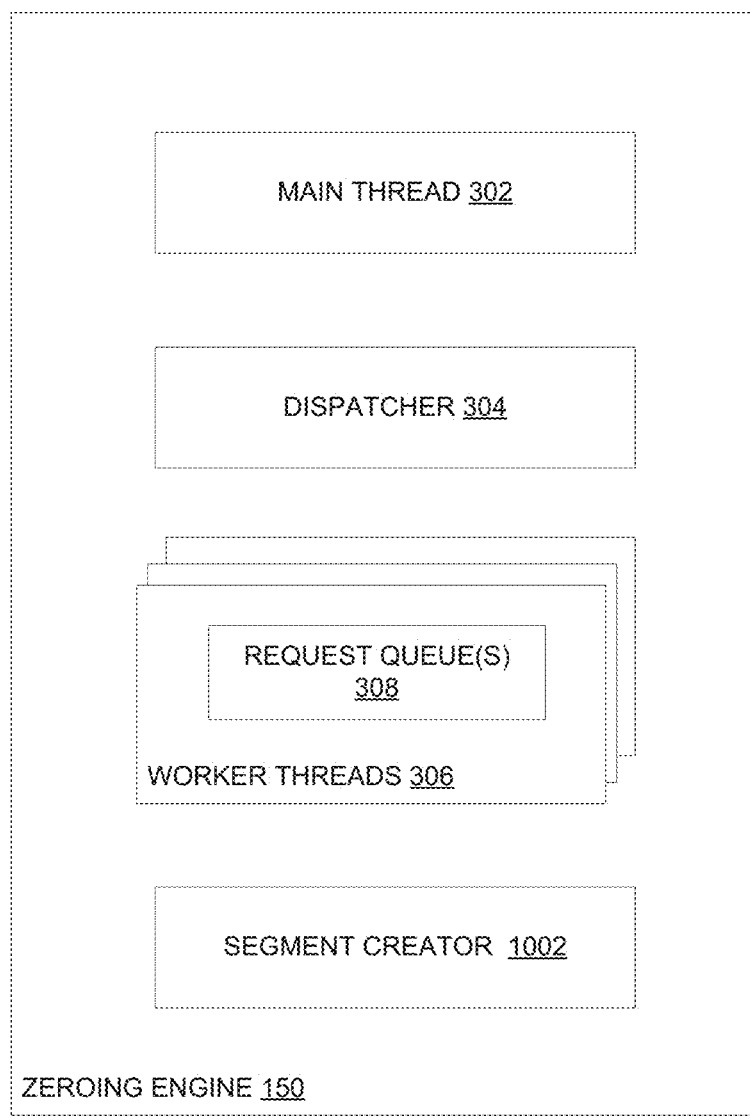
FIG. 10 illustrates a tool for parallel zeroing of pages in a computing system in which access to memory is non-uniform, according to one embodiment.

FIG. 10 further illustrates an example of the zeroing engine 150, described relative to FIG. 1, according to one embodiment. Note that many of the components (e.g., dispatcher 304, worker threads 306, queues 308, etc.) of the zeroing engine 150 depicted in FIG. 10 have same or similar functions as their corresponding components described relative to FIGS. 3-9. Therefore, for the sake of convenience, these functions (where the same) may not be described again below in the description.

As shown the zeroing engine 150 (in this embodiment) includes main thread 302, dispatcher 304, worker threads 306 and request queues 308, similar to the embodiment of zeroing engine 150 (described relative to FIG. 1). To implement zeroing of large pages during creation or allocation of the large page sizes, the zeroing engine 150 (in this embodiment) also includes a segment creator 1002. As described below, the segment creator 1002 creates a dummy segment of a predetermined size and populates the segment with as any pages as needed. In one embodiment, the number of pages that are included in the segment is based on a size that a large pool is requested to grow by. In another embodiment, the number of pages that are included in the segment is based on the size of the large page pool that needs to be created and initialized. After the segment creator 1002 creates the dummy segment, the zeroing engine 150 deletes the segment and performs zeroing of the pages in the memory segment using any of the techniques or any combination of the techniques described herein.

Doing so in this manner allows the zeroing engine 150 to be used for teardown of a shared memory region, dynamic growing of a large page pool, boot-time initialization of large pages, and other scenarios. Note, however, that FIG. 10 illustrates merely one possible arrangement of the zeroing engine 150. For example, although controller threads are not shown in the zeroing engine 150 shown in FIG. 10, it should be noted that zeroing engine 150 (in this embodiment) is also configured to perform zeroing in the background with one or more controller threads.

Figure 11:
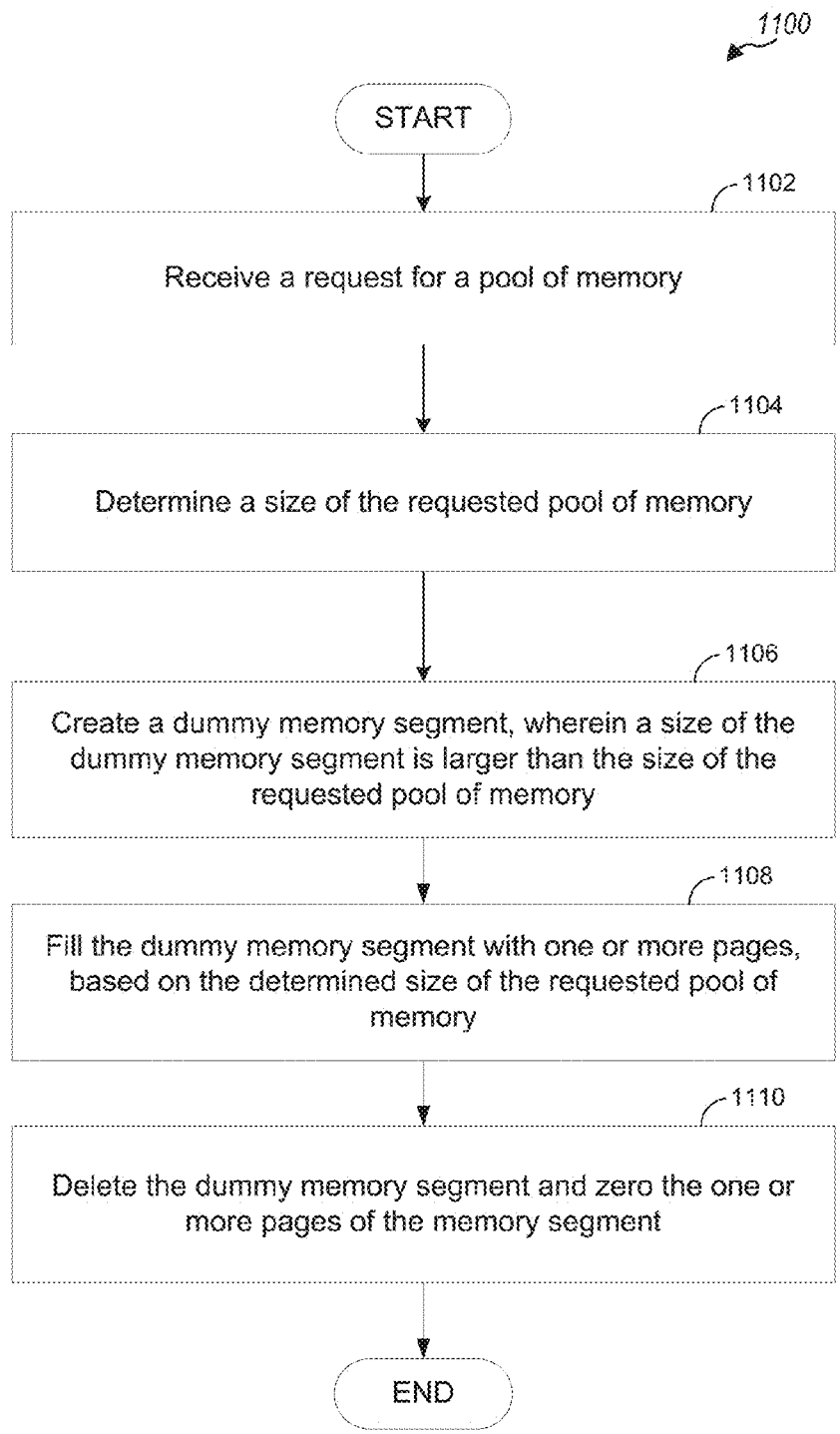
FIG. 11 illustrates a method for parallel zeroing of pages in a computing system in which access to memory is non-uniform, according to one embodiment.

FIG. 11 illustrates a method 1100 for performing parallel zeroing of a memory region in a computing system where access to memory is non-uniform, according to one embodiment. As shown, the method 1100 begins at step 1102, where the zeroing engine 150 receives a request to create a memory pool. In one embodiment, the request can be for expanding (or growing) a page pool. In another embodiment, the request can be for creating and initializing a page pool.

At step 1104, the zeroing engine 150 determines a size of the requested pool of memory. In one embodiment, the zeroing engine 150 determines the size of the requested pool of memory based on a size that the pool of memory is requested to grow by. In one embodiment, the zeroing engine 150 determines the size of the requested pool of memory based on a size of the pool of memory that needs to be created.

At step 1106, the zeroing engine 150 (via segment creator 1002) creates a dummy segment of memory. In one embodiment, the size of the dummy segment of memory is larger than the size of the requested pool of memory. At step 1108, the zeroing engine 150 (via segment creator 1002) populates (or fills) the dummy segment with one or more pages of memory based on the determined size of the requested pool of memory. At step 1110, the zeroing engine 150 deletes the segment and zeroes the one or more pages in the segment. The zeroing engine 150 is configured to zero the one or more pages in the segment using any of the techniques or combination of techniques described herein.

Figure 12:
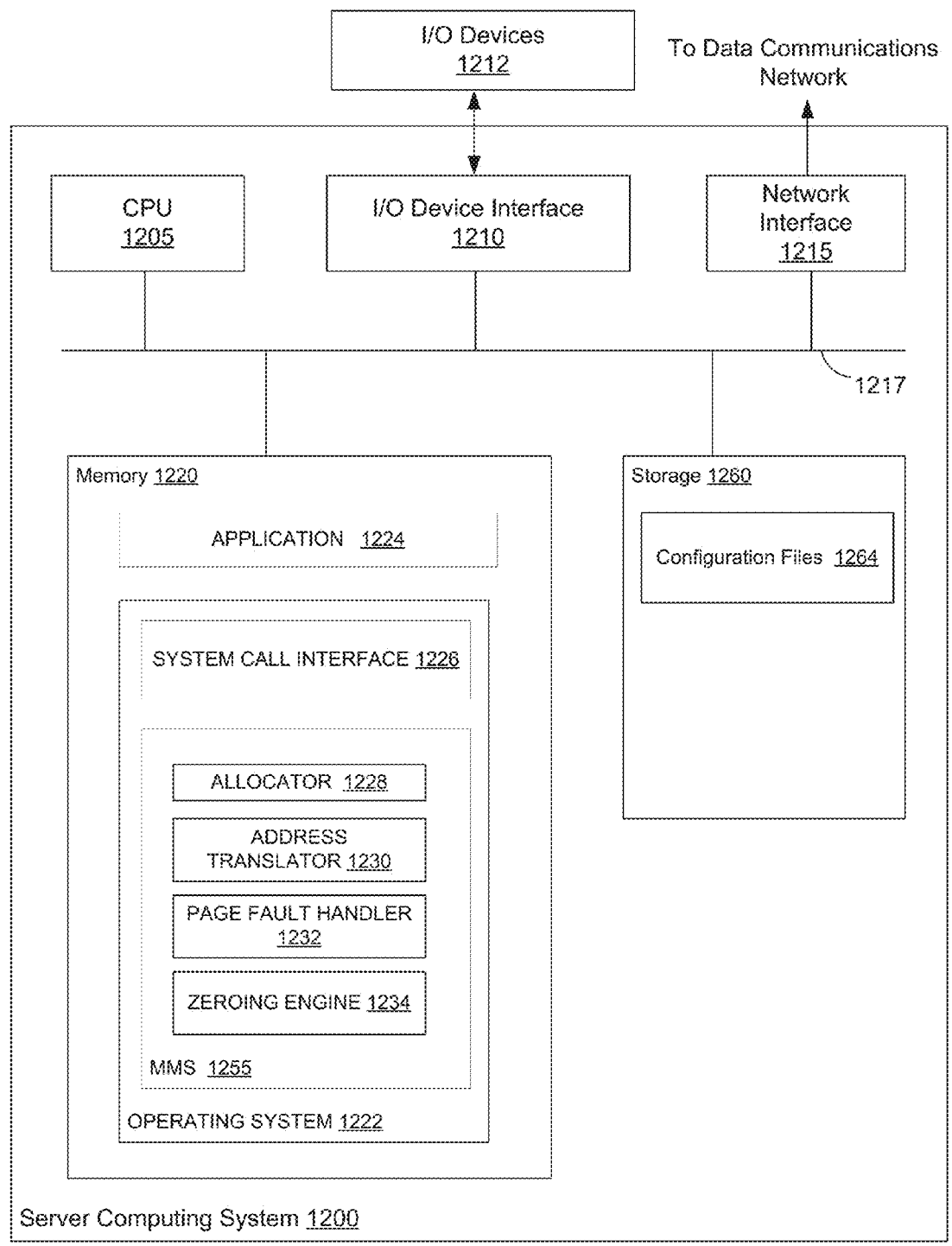
FIG. 12 illustrates a computing system configured to implement page zeroing, according to one embodiment.

FIG. 12 illustrates a computing system 1200 configured to perform parallel zeroing of memory, according to one embodiment. As shown, the computing system 1200 includes, without limitation, a central processing unit (CPU) 1205, a network interface 1215, a memory 1220, and storage 1260, each connected to a bus 1217. The computing system 1200 may also include an I/O device interface 1210 connecting I/O devices 1212 (e.g., keyboard, mouse, and display devices) to the computing system 1200. Further, in context of this disclosure, the computing elements shown in the computing system 1200 may correspond to a physical computing system (e.g., a system in a data center) or may be a virtual computing instance executing within a computing cloud.

The CPU 1205 retrieves and executes programming instructions stored in the memory 1220 as well as stores and retrieves application data residing in the memory 1220. The interconnect 1217 is used to transmit programming instructions and application data between CPU 1205, I/O devices interface 1210, storage 1260, network interface 1215, and memory 1220. Note, CPU 1205 is included to be representative of a single CPU, multiple CPUs, a single CPU having multiple processing cores, and the like. Memory 1220 is generally included to be representative of a random access memory. The storage 1260 includes configuration files 1264 and may be a disk drive storage device. Although shown as a single unit, storage 1260 may be a combination of fixed and/or removable storage devices, such as fixed disc drives, removable memory cards, or optical storage, network attached storage (NAS), or a storage area-network (SAN).

In one embodiment, the server computing system 1200 is a NUMA system. For example, one or more of the CPUs and memory in the server computing system may be defined in one or more affinity domains, depending on the access pathways (e.g., buses 1217) between the CPUs and memory.

Illustratively, the memory 1220 includes an operating system 1222 and applications 1224. The operating system 1222 is responsible for running applications 1224 and managing applications 1224 access to resources in the server computing system 1200. The operating system 1222 includes a system call interface 1226, allocator 1228, address translator 1230, page fault handler 1232 and zeroing engine 1234. The allocator is responsible for allocating and/or de-allocating physical and/or virtual resources to the set of applications (or processes) within the server computing system 1200. The address translator 1230 is used for translating between virtual addresses and physical addresses in memory. The page fault handler 1232 is used for resolving page faults that occur in response to referencing addresses mapped in virtual memory but not loaded in physical memory. As described above, for small memory pages, the page fault handler 1232 is configured to zero these small pages as part of the page-in process.

The zeroing engine 1234 is configured to perform any of the techniques and/or combination of techniques described herein. The components of the zeroing engine 1234 can include any one of the components shown in FIGS. 3, 7, 10 and/or any combination of the components described relative to FIGS. 3, 7 and 10. In embodiments, the zeroing engine 1234 is configured to perform parallel zeroing of (1) shared memory regions at teardown time (2) large page pools at boot-time initialization; and (3) dynamic growing of large page pools.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a static random access memory (SRAM), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the proxy service) or related data available in the cloud. For example, the proxy service could execute on a trusted computing system in a cloud and perform SAN disk management operations to disk units on behalf of a client of the SAN provider. In such a case, the proxy service could obtain client configuration information and store such information at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
    receiving, via a system call, a request for a pool of memory;
    determining, based on a type of the request, a size of the requested pool of memory;
    creating a dummy memory segment, wherein a size of the dummy memory segment is larger than the size of the requested pool of memory;
    filling the dummy memory segment with one or more pages, based on the determined size of the requested pool of memory; and
    deleting the dummy memory segment prior to allocating the one or more pages for the requested pool of memory, wherein deleting the dummy memory segment comprises zeroing the one or more pages in the dummy memory segment.

2. The method of claim 1, wherein zeroing the one or more pages in the dummy memory segment comprises:
    sorting the one or more pages of the dummy memory segment according to each associated affinity domain of each page, wherein each affinity domain comprises a cluster of processors and memory local to the cluster of processors; thank you;
    sending requests to zero the sorted one or more pages to one or more software threads that are attached to the respective affinity domain; and
    waiting, after sending the requests, to return to a system caller until a message is received, from the software threads in each affinity domain, indicating that all requests to zero have been processed.

3. The method of claim 1, wherein zeroing the one or more pages in the dummy memory segment comprises:
    transmitting a request to zero the one or more pages in the dummy memory segment to an intermediate software thread;
    using the intermediate software thread to perform the request as a background process; and
    upon receiving a message from the intermediate software thread, returning to a system caller, while performing the request, via the intermediate software thread, continues in the background.

4. The method of claim 1, wherein the type of request is a request to grow the pool of memory.

5. The method of claim 4, wherein the size of the requested pool of memory is determined based on a size that the pool of memory is requested to grow by.

6. The method of claim 1, wherein the type of request is a request to create the pool of memory.

7. The method of claim 6, wherein the size of the requested pool of memory is determined based on a size of the pool of memory that needs to be created.

* * * * *